United States Patent [19]
Hitomi

[11] Patent Number: 5,350,132
[45] Date of Patent: Sep. 27, 1994

[54] ANTI-REVERSE STRUCTURE FOR A SPINNING REEL

[75] Inventor: Yasuhiro Hitomi, Sakai, Japan

[73] Assignee: Shimano Inc., Osaka, Japan

[21] Appl. No.: 854,864

[22] Filed: Mar. 20, 1992

[30] Foreign Application Priority Data

Mar. 22, 1991 [JP] Japan ............... 3-017482[U]

[51] Int. Cl.⁵ .............. F16D 63/00; A01K 89/01
[52] U.S. Cl. ................... 242/247; 242/232; 188/82.3
[58] Field of Search ........... 242/247, 248, 232, 299, 242/300; 188/82.3, 82.34, 82.4, 82.7

[56] References Cited

U.S. PATENT DOCUMENTS

| | | | |
|---|---|---|---|
| 4,340,189 | 7/1982 | Volkert et al. | 188/82.3 X |
| 4,416,427 | 11/1983 | Kawai | 188/82.4 X |
| 4,546,932 | 10/1985 | Ohmori | 188/82.3 X |
| 4,614,314 | 9/1986 | Ban | 242/248 |
| 4,705,144 | 11/1987 | Yabe et al. | 188/82.4 X |
| 4,881,699 | 11/1989 | Emura | 242/248 |
| 4,919,361 | 4/1990 | Kobayashi | 242/247 X |
| 5,042,741 | 8/1991 | Aota | 242/247 X |

FOREIGN PATENT DOCUMENTS 6364 6/1983 Japan.

Primary Examiner—Daniel P. Stodola
Assistant Examiner—Michael R. Mansen
Attorney, Agent, or Firm—Dickstein, Shapiro & Morin

[57] ABSTRACT

An anti-reverse structure for a spinning reel includes ratchet teeth formed on an inner peripheral surface of a rotary frame attached to a front face of a reel body, pawls for engaging the ratchet teeth for preventing the rotary frame from rotating backward in a line releasing direction, and a drive element for changing the pawls between an operative position to engage the ratchet teeth and an inoperative position retracted from the ratchet teeth. The drive element is mounted inside the reel body and interlocked with a rotary frame drive system for driving the rotary frame backward and forward. The drive element is operable to change the pawls to the operative position with backward rotation in the line releasing direction of the rotary frame drive system.

12 Claims, 4 Drawing Sheets

ANTI-REVERSE STRUCTURE FOR A SPINNING REEL

BACKGROUND OF THE INVENTION

1. FIELD OF THE INVENTION

This invention relates to an anti-reverse structure for a spinning reel, and more particularly to an anti-reverse structure for a spinning reel having a stopper mechanism for preventing a rotary frame from rotating backward in a line unwinding direction.

2. DESCRIPTION OF THE RELATED ART

Conventionally, this type of anti-reverse structure for a spinning reel has a stopper mechanism including a ratchet wheel mounted on a spool shaft extending forwardly of a reel body to be rotatable with a rotary frame, and pawls for engaging teeth of the ratchet wheel (see Japanese Utility Model Publication No. 1988-64, for example).

The ratchet wheel mounted on the spool shaft as above is contained in an interior space of the rotary frame. Consequently, the ratchet wheel must have a small diameter. Further, the engaging teeth of the ratchet wheel must have a certain thickness in order to secure sufficient strength to resist backward rotation of the wheel. This results in a limited number of teeth formed on the ratchet wheel.

Since the teeth cannot be formed close to one another, there occurs play before the stopper mechanism becomes operative when a fish strikes a bait and the angler attempts to land the fish. When the stopper mechanism becomes operable by a pull from the fish, a shock corresponding to the play may occur with engagement between the pawls and teeth. This could result in breaking of the fishing line or other inconveniences.

The above anti-reverse structure further includes a drive element loosely fitted on a boss of the ratchet wheel for switching the pawls between an operative position to engage the teeth of the ratchet wheel and an inoperative position retracted from the teeth. This drive element and other associated components are disposed outside the reel body. Thus, these components are exposed to the influence of seawater. It is necessary to provide a certain measure, such as placing the drive element outside the reel body but inside the rotary frame, and sealing adjacent positions of the rotary frame and reel body to prevent entry of seawater and the like to the interior space of the rotary frame.

SUMMARY OF THE INVENTION

The object of the present invention is to provide an anti-reverse structure for a spinning reel which reduces the shock occurring when the stopper mechanism becomes operative and avoids malfunctioning of the drive element by selecting proper positions for installing engaging teeth and drive element.

The above object is fulfilled, according to the present invention, by an anti-reverse structure for a spinning reel comprising internal engaging teeth formed on an inner peripheral surface of a rotary frame attached to a front face of a reel body; a stopper mechanism including the engaging teeth and pawls for engaging the engaging teeth for preventing the rotary frame from rotating backward in a line releasing direction; and a position changing drive element for changing the pawls between an operative position to engage the engaging teeth and an inoperative position retracted from the engaging teeth; wherein the drive element is mounted inside the reel body and interlocked with a rotary frame drive system for driving the rotary frame backward and forward, the drive element being operable to change the pawls to the operative position with backward rotation in the line releasing direction of the rotary frame drive system.

This construction has the following functions and effects:

(1) The internal engaging teeth formed on the inner peripheral surface of the rotary frame has a large pitch circle diameter compared with an external tooth type ratchet wheel mounted on a spool shaft as in the prior art. Assuming that the same torque is applied as in the prior art, each tooth in this invention is subjected to a reduced load. This allows the teeth to be formed thin and close to one another.

Since the teeth may be arranged close to one another, little play occurs upon engagement, with a reduced engagement shock occurring when the stopper mechanism becomes operative.

(2) The drive element mounted inside the reel body is little influenced by seawater or the like.

The function (1) above producing a reduced engagement shock results in a reduced possibility of line breaking and damage to fish. The function (2) above promises a stable operation of the drive element over a long period.

Moreover, since the drive element receives a motive force from the rotary frame drive system to effect position changes, the position changes are carried out automatically. This provides the advantage of reducing the inconvenience due to the user forgetting to do the necessary.

Other features and advantages of the invention will be apparent from the following description.

DETAILED DESCRIPTION OF THE PREFERRED EMBODIMENTS

An anti-reverse structure for a spinning reel according to the present invention will be described in detail with reference to the drawings.

Figure 1:
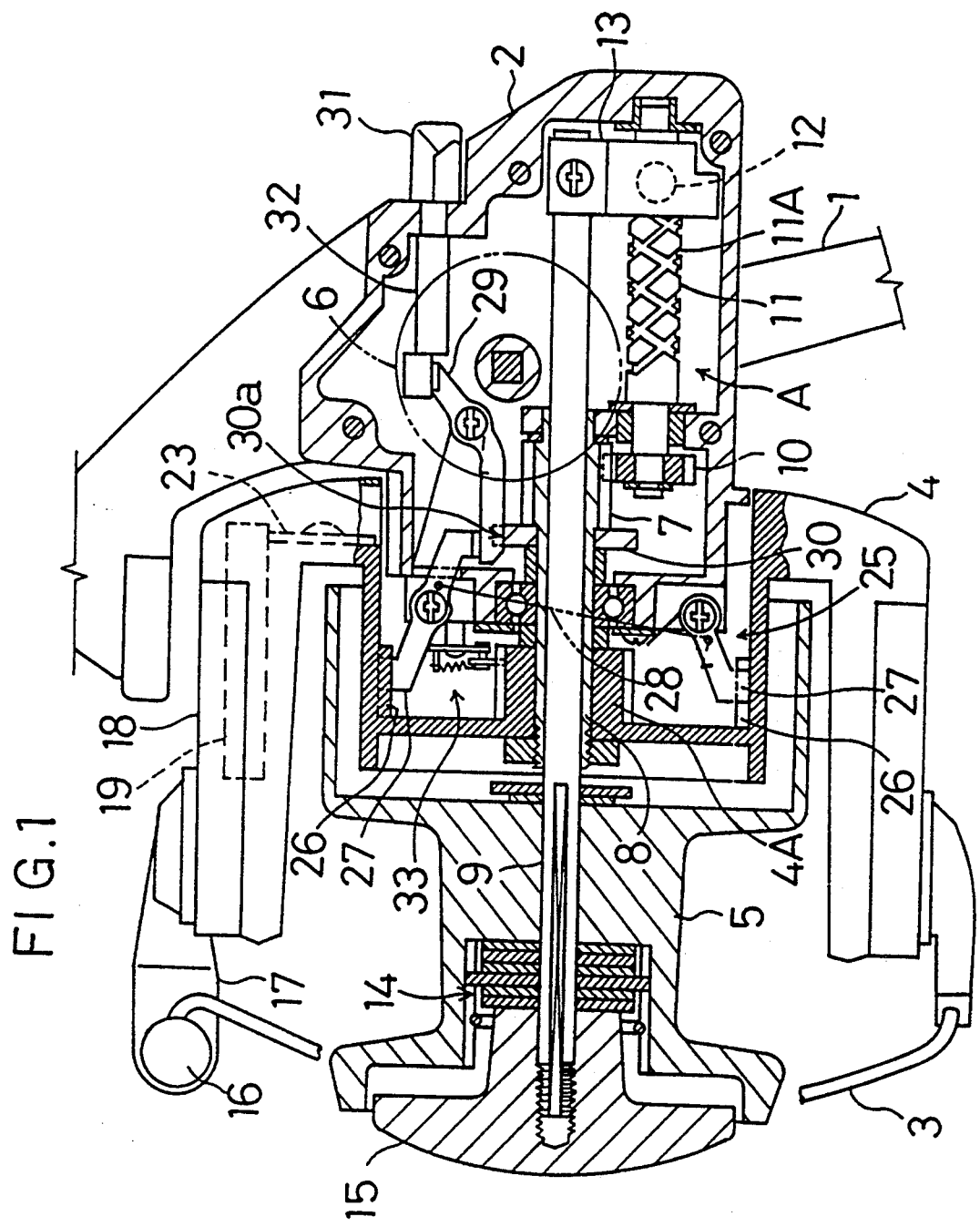
FIG. 1 is a side view in vertical section of a fishing reel.
Figure 4:
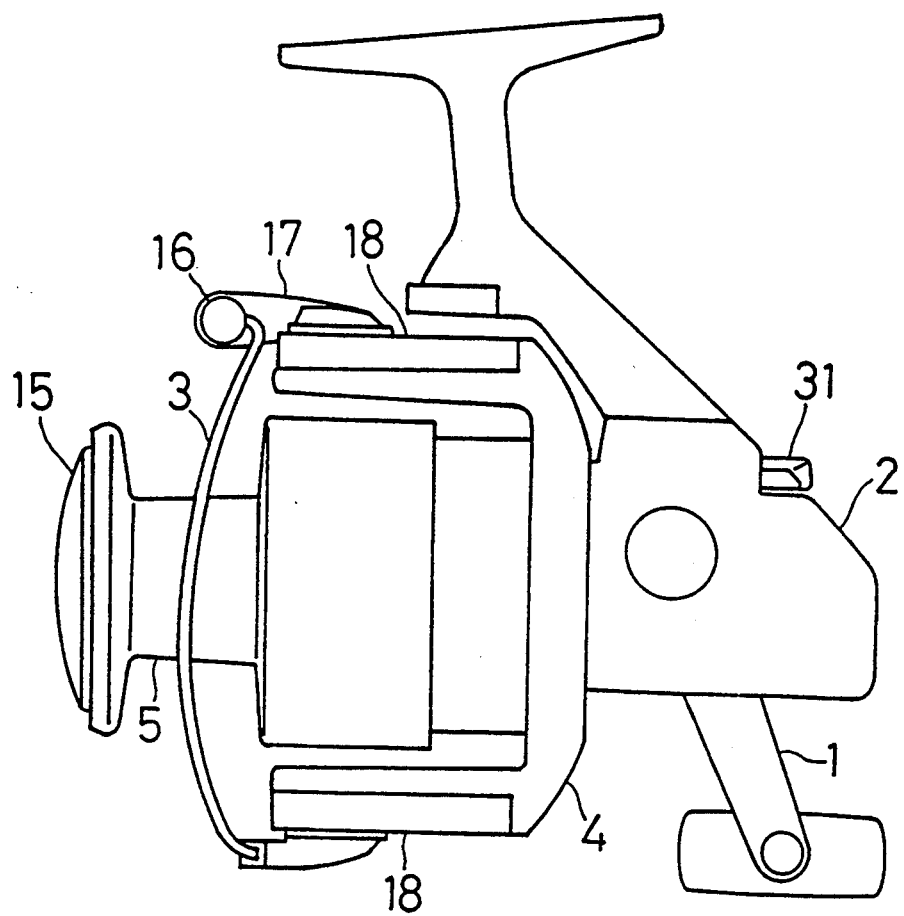
FIG. 4 is a side view of the fishing reel.

As shown in FIGS. 1 and 4, this spinning reel includes a handle 1 attached to a reel body 2, a rotary frame 4 carrying a bail arm 3 and mounted on a forward portion of the reel body 2, and a spool 5 connected to the forward portion of the reel body 2. The spinning reel further includes a drive system for transmitting drive from a drive gear 6 rotatable by the handle 1 to the rotary frame 4 through a pinion gear 7 and a sleeve shaft 8, and an oscillating mechanism A converting drive from the pinion gear 7 into a reciprocal motion back and forth for transmission to a spool shaft 9.

As shown in FIG. 1, the oscillating mechanism A includes an input gear 10 meshed with the pinion gear 7, a screw shaft 11 extending from the input gear 10, a slider 12 meshed with endless helical grooves 11A defined on the screw shaft 11, and a transmission member 13 for transmitting drive from the slider 12 to the spool shaft 9.

A friction disk type drag mechanism 14 is mounted on a forward position of the spool shaft 9 and in an interior space of the spool 5. The drag mechanism 14 includes a drag controller 15 screwed to a forward end of the spool shaft 9 for adjusting drag.

Figure 3:
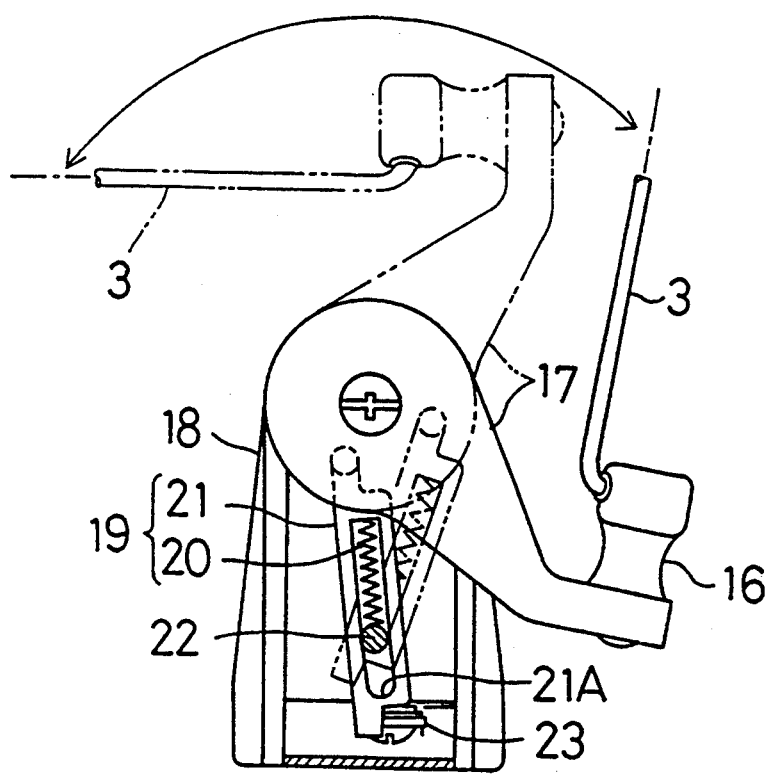
FIG. 3 is a plan view of a bail arm return mechanism.

A switching structure for switching positions of the bail arm 3 will be described next. As shown in FIG. 3, one end of the bail arm 3 is connected through an arm roller 16 to an arm cam 17. The arm cam 17 is oscillatably supported on a support arm 18 of the rotary frame 4. The bail arm 3 is in a line winding position when the arm cam 17 is set to a position as shown in two-dot-and-dash lines in FIG. 3, and in a line releasing position when the arm cam 17 is raised to a position as shown in solid lines in FIG. 3. The support arm 18 contains a toggle mechanism 19 in an interior space thereof for urging the bail arm 3 to the line winding position and line releasing position. The toggle mechanism 19 includes an urging spring 20 and a spring holder 21. The spring holder 21 defines a slot 21A extending longitudinally thereof for receiving a pivot pin 22. The spring holder 21 is attached to the pivot pin 22 to be movable in longitudinal direction of the holder 21 and pivotable about the pivot pin 22. The urging spring 20 is mounted in the slot 21A. with one end thereof contacting the pivot pin 22 to urge the spring holder 21 toward a forward end. One end of the spring holder 21 is attached to an inside wall of the arm cam 17, whereby the urging spring 20 acts on the arm cam 17. Thus, the arm cam 17 and bail arm 3 are maintained in the line winding position or line releasing position. A return lever 23 is provided at the other end of the spring holder 21. The return lever 23 is operable with a line winding operation of the handle 1 to contact the other end of the spring holder 21 in the line releasing position and return the spring holder 21 to the line winding position. These components constitute a simple construction for transmitting the returning force of the return lever 23 to the arm cam 17 through a minimized relay mechanism.

Figure 6:
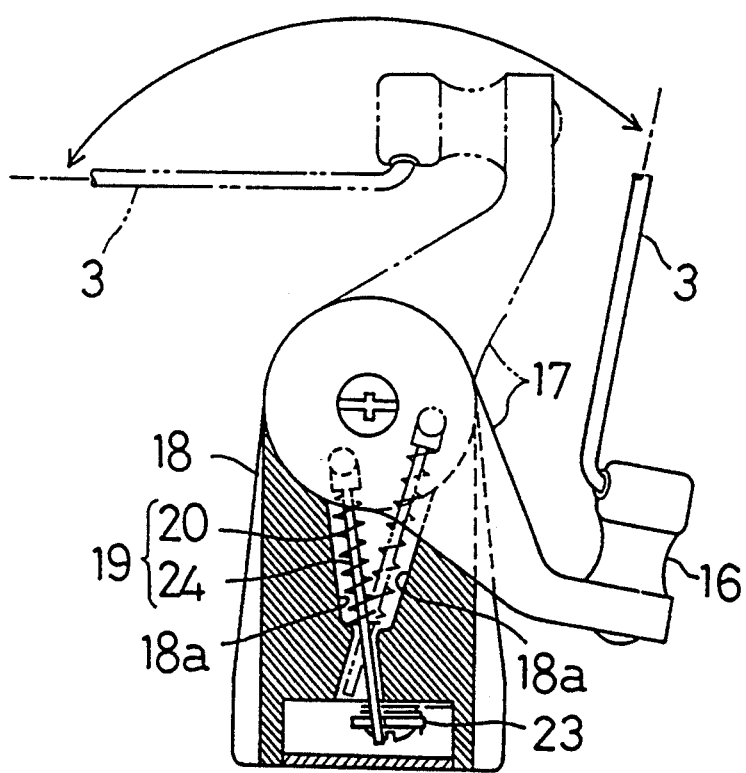
FIG. 6 is a plan view of a modified bail arm return mechanism.

FIG. 6 shows a construction alternative to the spring holder 21. This construction includes a slide rod 24 for supporting the urging spring 20. The slide rod 24 is slidably supported at an end thereof adjacent the return lever 23 by inner walls 18a of the support arm 18. The inner walls 18a define a bearing for supporting the urging spring 20.

Figure 2:
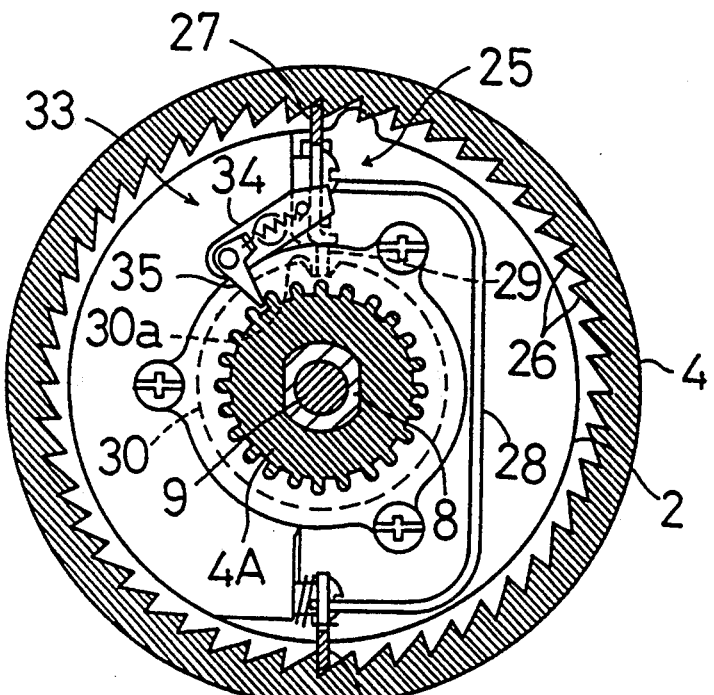
FIG. 2 is a front view in vertical section of a stopper mechanism.

A stopper mechanism 25 for preventing the rotary frame 4 from rotating backward in a line releasing direction will be described next. As shown in FIGS. 1 and 2, the rotary frame 4 defines an interior space opposed to a front face of the reel body 2 and recessed forwardly. Ratchet teeth 26 are formed on an inside peripheral surface defining the interior space. The rotary frame 4 is formed by molding or die-casting a resin, with the ratchet teeth 25 formed integral therewith. Two pawls 27 are disposed substantially opposite positions diametrically of said ratchet teeth 26 for engaging the ratchet teeth 26. The pawls 27 and ratchet teeth 26 constitute the stopper mechanism 25. Numeral 28 in the drawings denotes a connecting rod interconnecting the two pawls 27.

On the other hand, the reel body 2 supports a relay arm 29. The relay arm 29 has one end thereof disposed to act on the pawls 27. With oscillations of the relay arm 29. The pawls 27 are switchable between an inoperative position retracted from the ratchet teeth 26 and an operative position for engaging the ratchet teeth 26 by rotation about respective pawl axes, each pawl axis being normal to the axis about which the rotary frame 4 rotates, and each pawl axis being parallel to each other pawl axis. A rotary cam 30 is disposed adjacent the one end of the relay arm 29 and relatively rotatably mounted on the sleeve shaft 8 adjacent the pinion gear 7. A frictional interlocking mechanism (not shown) is provided between the pinion gear 7 and rotary cam 30, whereby the rotary cam 30 is rotatable backward and forward with rotation of the pinion gear 7. Stopper pins, not shown, are provided right and left to contact the rotary cam 30 for limiting the rotation thereof within a predetermined range. The rotary cam 30 includes a peripheral recess 30a which, together with an outer peripheral surface, defines a cam surface. The relay arm 29 is urged for contact with the periphery of the rotary cam 30. Thus, the one end of the relay arm 29 is switchable between a position engaging the recess 30a of the rotary cam 30 and a position pushed up onto the peripheral surface other than the recess 30a.

According to the above construction, when the handle 1 is turned in the line releasing direction, the relay arm 29 moves into the recess 30a of the rotary cam 30, and the one end of the relay arm 29 does not act on the pawls 27. Consequently, the pawls 27 engage the ratchet teeth 26 under the urging force, to prevent the rotary frame 4 from rotating backward. When the handle 1 is turned in the line winding direction, the relay arm 29 is lifted to move along the outer periphery of the rotary cam 30 and act on an end of the pawl 27, thereby to retract the pawls 27 from the ratchet teeth 26. Thus, the rotary cam 30 acts as a drive element for switching the pawls 27 between the operative position for engaging the ratchet teeth 26 and the inoperative position retracted from the ratchet teeth 26. Since the two pawls 27 engage diametrically opposite positions of the ratchet teeth 26, reaction forces acting on the rotary frame 4 offset each other to avoid inclination of the rotary frame 4.

A switch lever 31 projects from a rear end of the reel body 2 adjacent a rear end of the relay arm 29. The switch lever 31 is integral with a switching rod 32 pivotable about its own axis to act on the relay arm 29. When the switching rod 32 is operated to act on and depress the relay arm 29, the pawls 27 are forcibly retracted from the ratchet teeth 26 to allow the handle 1 to be turned forward and backward. Conversely, when the switching rod 32 is separated from the relay arm 29 to allow the rotary cam 30 to place the relay arm 29 in a seesaw-like oscillatable condition. Then, the rotary frame 4 is rotatable in the line winding direction by turning the handle 1 forward. The rotary frame 4 is not rotatable by turning the handle 1 backward.

A sound producing mechanism 33 will be described next. As shown in FIGS. 1 and 2, the rotary frame 4 includes a sound producing gear formed on an outer periphery of a boss 4A thereof extending inwardly. An oscillatable arm 34 is provided adjacent the sound producing gear, which carries a sound producing piece 35 snapped by the sound producing gear to produce a clicking sound. One end of the oscillatable arm 34 is movable into contact with one end of the pawl 27. When the pawl 27 engages the ratchet teeth 26, the one end of the oscillatable arm 34 is separated a predetermined distance from the one end of the pawl 27. Thus, when the fishing line is wound up with the pawl 27 separated from the ratchet teeth 26 by the rotary cam 30, the pawl 27 only lies close to the oscillatable arm 34, and the sound producing piece 35 is maintained in engagement with the sound producing gear to produce the clicking sound.

When the switch level 31 is operated to oscillate the relay arm 29 to forcibly separate the pawl 27 from the ratchet teeth 26, the pawl 27 is oscillatable through a greater stroke than when driven by the rotary cam 30. The pawl 27 then contacts the oscillatable arm 34 to separate the sound producing piece 35 from the sound producing gear.

Figure 5:
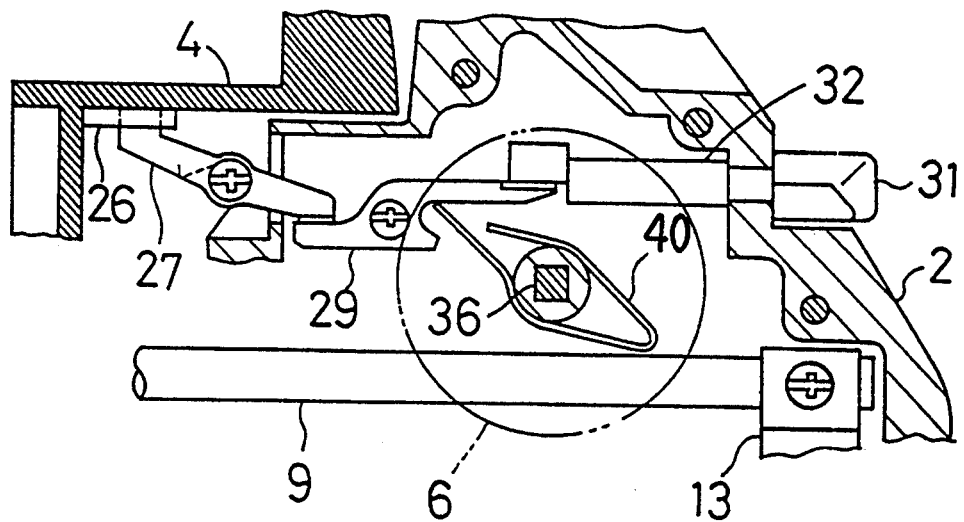
FIG. 5 is a side view in vertical section of a stopper mechanism in a different embodiment.

FIG. 5 shows a modified drive element 40. This drive element 40 is in the form of a spring fitted on a drive gear shaft 36 acting as a handle shaft. The drive element 30 is rotatable with the drive gear shaft 36 by a frictional force therebetween. The relay arm 29 defines a recess for engaging an end of the drive element 40. The relay arm 29 is driven only when the drive gear shaft 36 rotates in the line winding direction, to separate the pawls 27 from the ratchet teeth 26.

The stopper mechanism 25 may comprise a simple stopper instead of being the ratchet type.

The drive element 40 may be dissociated from the operation of the sound producing mechanism 33. The drive element 40 will serve the purpose only if interlocked with the rotary frame drive system.

What is claimed is:

1. An anti-reverse structure for a spinning reel comprising:
   internal engaging teeth formed on an inner peripheral surface of a rotary frame attached to a front face of a reel body;
   a stopper mechanism including said engaging teeth and at least two pawls for engaging said engaging teeth for preventing said rotary frame from rotating backward in a line releasing direction; and
   a position changing drive element for changing said pawls between an operative position to engage said engaging teeth and an inoperative position retracted from said engaging teeth;
   wherein said drive element is mounted inside said reel body and interlocked with a rotary frame drive system for driving said rotary frame backward and forward, said drive element being operable to change said pawls to said operative position with backward rotation in said line releasing direction of said rotary frame drive system.

2. An anti-reverse structure as claimed in claim 1, wherein said drive element is a rotary cam disposed adjacent one end of a relay arm pivotally supported in said reel body.

3. An anti-reverse structure as claimed in claim 2, wherein said one end of said relay arm is disposed in a position to act on said pawls, said relay arm being pivotable to switch said pawls between said inoperative position retracted from said engaging teeth and said operative position for engaging said engaging teeth.

4. An anti-reverse structure as claimed in claim 3, wherein said rotary cam includes a peripheral recess which, together with an outer peripheral surface, defines a cam surface, said relay arm being urged for contact with peripheries of said rotary cam, said one end of said relay arm being switchable between a position engaging said recess and a position pushed up onto said outer peripheral surface other than said recess.

5. An anti-reverse structure as claimed in claim 1, wherein said stopper mechanism includes two pawls for engaging said engaging teeth, said two pawls being disposed in substantially opposite positions diametrically of said engaging teeth.

6. An anti-reverse structure as claimed in claim 1, wherein said drive element is a spring fitted on a drive gear shaft, said drive element being rotatable with said drive gear shaft by a frictional force therebetween.

7. An anti-reverse structure as claimed in claim 6, wherein said drive element is a spring engaged with a recess formed in a relay arm pivotally supported in said reel body, said relay arm being driven only when said drive gear shaft rotates in a line winding direction, to separate said pawls from said engaging teeth.

8. A spinning reel comprising:
   a reel body;
   a rotary frame provided forwardly of said reel body, said rotary frame being rotatable about a first axis; and
   an anti-reverse mechanism for restricting rotation of said rotary frame in a line releasing direction, said anti-reverse mechanism including:
   a plurality of engaging teeth formed on an inner peripheral surface of said rotary frame;
   a first engaging pawl supported by said reel body through a first pawl axis, said pawl axis being substantially normal to said axis of said rotary frame, said first engaging pawl extending substantially along said axis of said rotary frame, said first engaging pawl having a first end and a second end, said first engaging pawl being pivotable about said pawl axis between first and second positions, and wherein said first end is engaged with one of said teeth when said first engaging pawl is in said first position, and said first end being disengaged from said teeth when said pawl is in said second position;
   urging means for urging said first engaging pawl toward said first position;
   a drive element operatively connected to said second end of said first engaging pawl, said drive element being operable to move said first engaging pawl to said second position when said rotary frame rotates in a line winding direction, and said drive element being operable to move said first engaging pawl to said first position when said rotary frame rotates in said line releasing direction; and
   an external change-over lever mounted on said reel body, said external change-over lever being operable to forcibly pivot said first engaging pawl to said second position.

9. A spinning reel as claimed in claim 8, further comprising a pivotable relay arm, said second end of said first engaging pawl being associated with said drive element through said relay arm, said external change-over lever being operable through said relay arm to pivot said first engaging pawl to said second position.

10. A spinning reel as claimed in claim 8, wherein said rotary frame includes a rotary frame shaft coaxial with said axis of said rotary frame, said drive element being a cam mounted on said rotary frame shaft, and said cam being in frictional engagement with said rotary frame shaft, such that said cam is rotatable in a specified angular range about said rotary frame shaft.

11. A spinning reel as claimed in claim 10, wherein said cam is a circular disc having a circumferential surface and a recessed portion, said reel being arranged such that said relay arm is pivoted by being pushed out of said recessed portion by rotation of said circular disc.

12. A spinning reel as claimed in claim 8, further comprising a second engaging pawl for engaging said engaging teeth, said second engaging pawl being pivotable about a second pawl axis, said second pawl axis being parallel to said first pawl axis, said axis of said rotary frame being located between said first and second engaging pawls, and said reel including means for pivoting said second engaging pawl in synchronism with said first engaging pawl.

* * * * *